(12) United States Patent
Shimotsu et al.

(10) Patent No.: US 8,408,632 B2
(45) Date of Patent: Apr. 2, 2013

(54) BUMPER REINFORCEMENT MEMBER

(75) Inventors: Kouji Shimotsu, Soja (JP); Masafumi Wakabayashi, Soja (JP)

(73) Assignee: Asteer Co., Ltd., Okayama (JP)

( * ) Notice: Subject to any disclaimer, the term of this patent is extended or adjusted under 35 U.S.C. 154(b) by 215 days.

(21) Appl. No.: 12/952,072

(22) Filed: Nov. 22, 2010

(65) Prior Publication Data
US 2011/0127783 A1    Jun. 2, 2011

(30) Foreign Application Priority Data
Nov. 27, 2009  (JP) .................................. 2009-270389

(51) Int. Cl.
*B62D 25/06*    (2006.01)

(52) U.S. Cl. ........................................ 296/102
(58) Field of Classification Search .................. 293/102, 293/109, 117, 120, 121, 132, 155
See application file for complete search history.

(56) References Cited

U.S. PATENT DOCUMENTS

| | | | | |
|---|---|---|---|---|
| 2,903,289 A * | 9/1959 | Klix | ............................. | 293/136 |
| 3,778,093 A * | 12/1973 | Renner | ........................ | 293/120 |
| 4,088,357 A * | 5/1978 | Klie et al. | ..................... | 293/122 |
| 5,106,137 A * | 4/1992 | Curtis | .......................... | 293/107 |
| 5,122,398 A * | 6/1992 | Seiler et al. | ................... | 428/31 |
| 5,290,078 A * | 3/1994 | Bayer et al. | .................. | 293/120 |
| 5,441,319 A * | 8/1995 | Oyama et al. | ................. | 293/155 |
| 5,577,784 A * | 11/1996 | Nelson | ......................... | 293/120 |
| 5,780,129 A * | 7/1998 | Ohta | ............................ | 428/35.7 |
| 6,609,740 B2 * | 8/2003 | Evans | .......................... | 293/121 |
| 6,726,261 B2 * | 4/2004 | Goto et al. | .................... | 293/120 |
| 6,814,380 B2 * | 11/2004 | Yoshida et al. | .............. | 293/120 |
| 6,877,785 B2 * | 4/2005 | Evans et al. | ................... | 293/120 |
| 7,131,674 B2 * | 11/2006 | Evans et al. | ................... | 293/120 |
| 7,222,896 B2 * | 5/2007 | Evans | .......................... | 293/120 |
| 7,222,897 B2 * | 5/2007 | Evans et al. | ................... | 293/120 |
| 7,399,014 B2 * | 7/2008 | Mellis et al. | .................. | 293/120 |
| 7,641,245 B2 * | 1/2010 | Adachi et al. | ................. | 293/102 |
| 8,016,331 B2 * | 9/2011 | Ralston et al. | ............... | 293/120 |
| 8,061,743 B2 * | 11/2011 | Wakabayashi et al. | ........ | 293/102 |
| 8,066,322 B2 * | 11/2011 | Mori | ........................ | 296/187.03 |
| 8,157,046 B2 * | 4/2012 | Tanabe | .......................... | 180/274 |
| 8,196,979 B2 * | 6/2012 | Ralston et al. | ............... | 293/121 |
| 2003/0155806 A1 | 8/2003 | Goto et al. | | |

(Continued)

FOREIGN PATENT DOCUMENTS

JP    2003-237507 A    8/2003
JP    2004-074834 A    3/2004

(Continued)

*Primary Examiner* — Kiran B Patel
(74) *Attorney, Agent, or Firm* — DLA Piper LLP (US)

(57) ABSTRACT

A bumper reinforcement member including a front reinforcement member and a back reinforcement member, wherein the front reinforcement member includes a front intermediate face, which becomes a bumper front face, and a front groove arranged above and below the front intermediate face and that recesses from the bumper front face side towards a bumper rear face side; the back reinforcement member includes a back intermediate face positioned on a front side than bottom faces of both upper and lower front grooves, and a back groove arranged above and below the back intermediate face and that recesses from the bumper front face side towards the bumper rear face side; and the front reinforcement member and the back reinforcement member have the front groove contained in the back groove without bringing at least the bottom faces of the front groove and the back groove into surface contact with each other.

7 Claims, 15 Drawing Sheets

U.S. PATENT DOCUMENTS

| | | | |
|---|---|---|---|
| 2007/0046044 A1* | 3/2007 | Tanabe | 293/120 |
| 2008/0093867 A1* | 4/2008 | Glasgow et al. | 293/102 |
| 2008/0203742 A1* | 8/2008 | Takahashi | 293/117 |
| 2009/0027181 A1* | 1/2009 | Tanabe et al. | 340/436 |
| 2012/0025545 A1* | 2/2012 | Haneda et al. | 293/102 |

FOREIGN PATENT DOCUMENTS

| | | |
|---|---|---|
| JP | 2005-170234 A | 8/2005 |

* cited by examiner

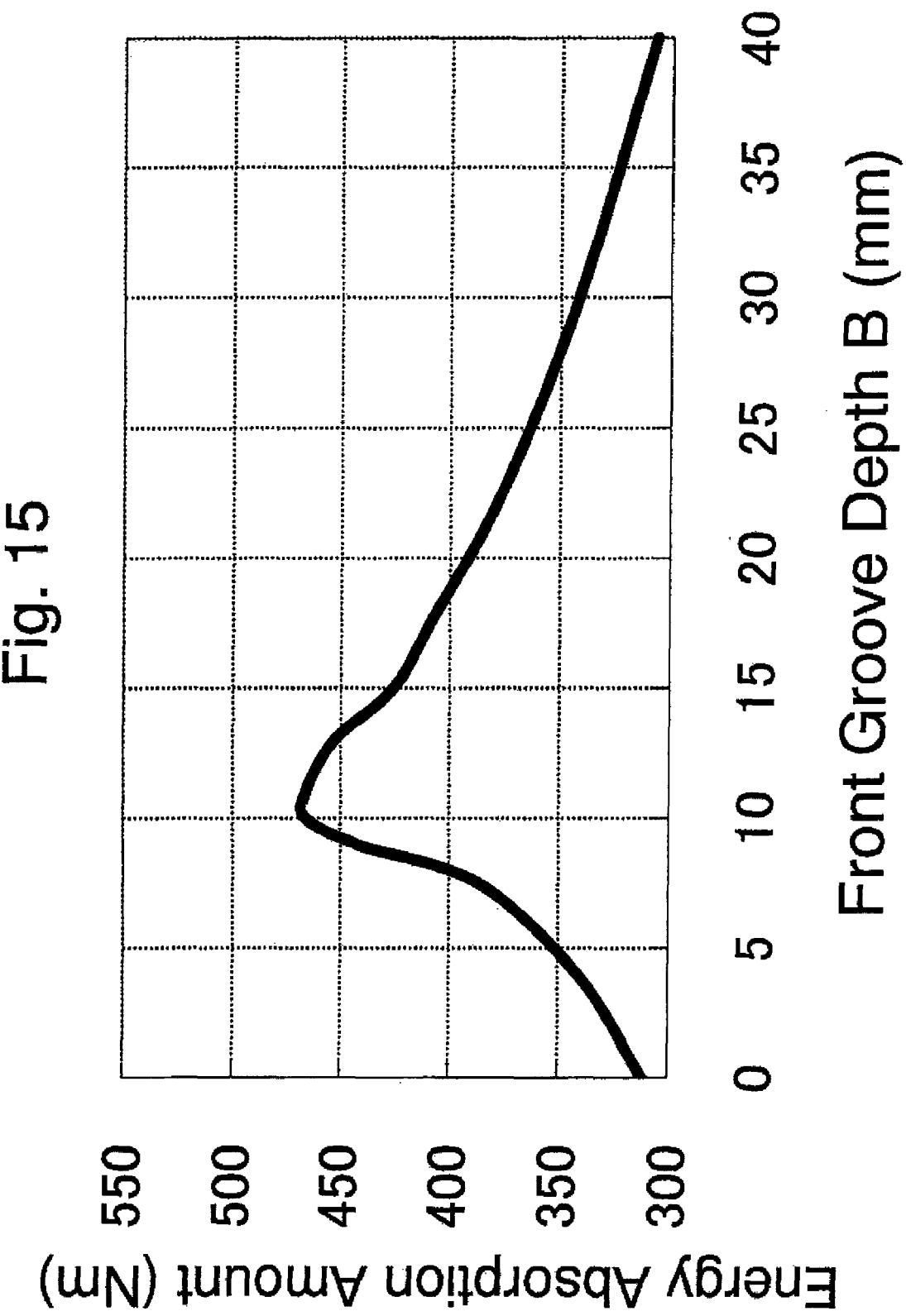

BUMPER REINFORCEMENT MEMBER

BACKGROUND OF THE INVENTION

1. Field of the Invention

The present invention relates to a bumper reinforcement member configuring a bumper of a vehicle.

2. Description of the Related Art

A bumper of a vehicle is configured by a bumper reinforcement member for absorbing impact, and a bumper cover for covering the bumper reinforcement member. The bumper reinforcement member absorbs impact by deforming a hollow section (plastic deform of a face that forms the section). In general, a superior bumper has a high maximum value (peak load) in a three-point bending test applying a load at one point and supports a test piece at the other two points, a larger deformed amount and a larger value of integral (in other words, impulse or gross amount of energy absorption). An energy absorption property in the bumper reinforcement member can be enhanced by thickening each face that is plastic-deformed, using a high strength material, or making the cross section complicating.

JP2005-170234A discloses a bumper reinforcement member (impact absorption member) including a plurality of vertical walls having different heights (width in a front and back direction of a vehicle) and a horizontal wall that couples the vertical walls to each other. The bumper reinforcement member is formed with a step at the horizontal wall (4, 5, 9 in FIG. 1 of JP2005-170234A). The vertical walls are arranged in a positional relationship of interfering with each other when buckled or crushed by impact. JP2005-170234A says that, according to such a bumper reinforcement member, the peak load that occurs first (initial peak load) becomes small and the energy absorption amount can be enhanced since the impact is applied in a step wise manner.

The bumper reinforcement member disclosed in JP2005-170234A has a problem in that the deformation of each vertical wall is not uniform as the vertical wall is long. Therefore, the vertical walls may not necessarily interfere when buckled or crushed. Even if the vertical walls are assumed to interfere with each other, the vertical walls are believed to not interfere with each other unless the respective vertical walls are greatly buckled or crushed since each vertical wall is greatly spaced apart. Furthermore, as it is clear from the fact that the bumper reinforcement member has a plurality of peak loads (see graph of FIG. 5 of JP2005-170234A), a stable energy absorption property may not be obtained as a whole. Moreover, since the peak loads appear in plural times, the energy absorption amount inevitably becomes small as a whole.

JP2003-237507A discloses a bumper reinforcement member including a main reinforcement member 1 supported to a vehicle body side, and a supplementary reinforcement member 3 to be attached to a front face of the main reinforcement member. The supplementary reinforcement member has a substantially concaved sectional portion 2 and the main reinforcement member has a concaved groove portion 5. The substantially concaved. sectional portion 2 is in contact with the concaved groove portion 5. The bumper reinforcement member disclosed in JP2003-237507A does not require special members. The structure is also easy to process. Changes in material and special production facilities are unnecessary, and increase in cost can be suppressed. Furthermore, the energy absorption amount is enhanced while suppressing local buckling.

The bumper reinforcement member of JP2003-237507A is designed so that a high peak load appears only once. In this configuration, a stable energy absorption property and a large energy absorption amount are obtained, compared to JP 2005-170234A. However, since the supplementary reinforcement member is attached to the front face of the main reinforcement member, and the supplementary reinforcement member greatly projects out from the front face of the main reinforcement member, the bumper reinforcement member inevitably becomes large. Increase in weight also becomes a problem. Variety of design is also limited. Thus, the bumper reinforcement member disclosed in JP2003-237507A is difficult to use in light automobiles to which weight limits and layout limits are strictly imposed and automobiles having high designability.

JP2004-074834A, discloses a bumper reinforcement member including a main reinforcement member 3 of a rear face opened sectional structure with a front face 9, an upper lateral face 10 and a lower lateral face 11, and an supplementary reinforcement member bridged to the upper and lower lateral faces from the front face of the main reinforcement member. The supplementary reinforcement member has a mountain folded portion 14 on the front face 9. The main reinforcement member 3 includes, on the front face, a front face groove 2 having a concaved cross section with a groove bottom face 12 and a groove lateral face 11, and the supplementary reinforcement member 1 is bridged to the upper and lower lateral faces from the front face groove. The bumper reinforcement member disclosed in JP2004-074834A has a rear face opened sectional structure (structure in which the rear face is opened). The bumper reinforcement member has a high peak load and a large energy absorption amount that are not inferior to the bumper reinforcement member of a closed sectional structure.

The bumper reinforcement member disclosed in JP2004-074834A is not as enlarged as the bumper reinforcement member disclosed in JP2003-237507A since the supplementary reinforcement member is arranged inside the main reinforcement member. Therefore, the bumper reinforcement member of JP2004-074834A does not impose a design limitation. JP2004-074834A gives importance to controlling the deformation of an opened sectional structure. In other words, the energy absorption property of the same extent as the bumper reinforcement member of the closed sectional structure is merely ensured. Therefore, the bumper reinforcement member disclosed in JP2004-074834A does not increase the peak load or increase the energy absorption amount compared to the bumper reinforcement member of the closed sectional structure.

The energy absorption property in the bumper reinforcement member can be enhanced by thickening each face that is plastic-deformed, using a high strength material, or making the cross section complicating. However, the bumper reinforcement member is enlarged and the weight becomes excessively large if each face is thickened. The manufacturing cost becomes high if the high strength material is used. Making the cross section complicating deprives variety of design of the bumper reinforcement member and has a possibility of influencing the design of the entire vehicle. Therefore, miniaturization, reduction in manufacturing cost, and simplification of the cross section become important issues in enhancing the energy absorption property.

SUMMARY OF THE INVENTION

The present invention relates to a bumper reinforcement member including a front reinforcement member and a back reinforcement member, wherein the front reinforcement member includes a front intermediate face, which becomes a bumper front face, and a front groove that is arranged above and below the front intermediate face and that recesses from the bumper front face side towards a bumper rear face side; the back reinforcement member includes a back intermediate face positioned on a front side than bottom faces of both upper and lower front grooves, and a back groove that is arranged above and below the back intermediate face and that recesses from the bumper front face side towards the bumper rear face side; and the front reinforcement member and the back reinforcement member have the front groove contained in the back groove without bringing at least the bottom faces of the front groove and the back groove into surface contact with each other.

The front reinforcement member and the back reinforcement member may satisfy a following condition $$B = (1/10 \text{ to } 1/2)L$$

$$0 \leq A < 1/10 L$$

where B is a depth of the front groove from the bumper front face to the bottom face of the front groove, L is a depth of the back groove from the bumper front face to the bottom face of the back groove, and A is a smallest distant from a corner, which connects an upper lateral face or a lower lateral face and the bottom face of the front groove, to an upper lateral face or a lower lateral face of the back groove.

Here, "front groove depth B" refers to the smallest orthogonal distance between the surface of the bumper front face and the surface of the bottom face of the front groove. The "smallest distance A" from the corner to each of the upper lateral face or the lower lateral face of the back groove refers to the smallest orthogonal distance of the surface of the corner and the upper lateral face or the lower lateral face of the back groove to which the corner faces. The bumper reinforcement member of the present invention has the back intermediate face projected to the front side than the bottom faces of the front grooves, and hence the smallest distance A of four areas can be set with the corners at four areas connecting the upper lateral face or the lower lateral face and the bottom face of each of the upper and lower front grooves facing the upper lateral face or the lower lateral face of each of the upper and lower back grooves.

In the bumper reinforcement member of the present invention, the back intermediate face positioned on the front side than the bottom faces of the front grooves comes into contact with the front intermediate face and starts to integrally deform when a force is applied from the bumper front face. In the present invention, a high peak load thereby appears. The S-shaped cross section formed when the lateral face of the back groove deforms. Also the S-shaped cross section formed when the lateral face of the front groove deforms. In the present invention, S-shaped cross sections formed by the back groove deformation and the front groove deformation face each other in a shifted manner. Thus, the respective expansion collide with each other thereby suppressing the deformation of the lateral face of the back groove and the lateral face of the front groove, and gradually lowering the change in energy absorption property followed from the peak load. The present invention increases the energy absorption amount of the bumper reinforcement member by the high peak load and the gradual energy absorption property.

When a force is applied from the bumper front face, the peak load rises until the front intermediate face and the back intermediate face are in contact with each other and start to integrally deform. When the back intermediate face and the front intermediate face start to integrally deform, about first half of the respective lateral faces of the front groove and the back groove inwardly expands to narrow the groove width, and about last half of the lateral faces outwardly expands to widen the groove width. Each lateral face thus becomes an S-shaped cross section. Therefore, if the front groove depth B of each front groove is smaller than or equal to ½ of the back groove depth L of the back groove containing the front groove, the expansion of the last half of the lateral face of the front groove and the expansion of the first half of the lateral face of the back groove can be brought to interfere thereby suppressing the respective deformation. However, the lateral face of the front groove becomes difficult to deform if the front groove depth B is too small, and hence the front groove depth B is greater than or equal to 1/10 of the back groove depth L.

In this case, when the first half of the lateral face of the back groove starts to deform, the last half of the lateral face of the front groove preferably starts to deform outwardly without delay, so that the lateral face of the front groove and the lateral face of the back groove interfere as fast as possible. Therefore, the smallest distance A from the corner connecting the upper lateral face or the lower lateral face and the bottom face of the front groove to the upper lateral face or the lower lateral face of the back groove fitted with the front groove is most preferably "0 (zero)". On the contrary, the deformation of the first half of the lateral face of the back groove and the collision with the last half of the lateral face of the front groove delay as the smallest distance A becomes greater. When the smallest distance A becomes too large, the effect in which the front groove and the back groove suppress the respective deformation may be lost. Therefore, the smallest distance A is smaller than or equal to 1/10 of the back groove depth L.

As described above, in the bumper reinforcement member of the present invention, the front intermediate face and the back intermediate face comes into contact with each other and start to integrally deform when the force is applied from the bumper front face, whereby high peak load is achieved. Therefore, the back intermediate face is preferably brought into contact with the front intermediate face from the bumper rear face side and integrated from the beginning to enhance the peak load to a maximum. In this case, a portion of high rigidity is formed at the middle in the vertical direction of the bumper reinforcement member. The peak load of the bumper reinforcement member thus can be enhanced to a maximum. Furthermore, since the portion of high rigidity is deformed at the early step of applying a force to the bumper front face, fluctuation of load occurring when deforming the portion of weak rigidity, or from other reasons is thus less likely to occur. Thus, the bumper reinforcement member of the present invention in which the back intermediate face is brought into contact with the front intermediate face from the bumper rear face side realizes higher peak load and more gradual energy absorption property.

For example, the bumper reinforcement member of the present invention has the front reinforcement member and the back reinforcement member configured as sheet metal members of separate bodies. Specifically, the front reinforcement member has a front upper flange extending from a front end of an upper lateral face of the upper front groove, a front lower flange extending from a front end of a lower lateral face of the lower front groove, and a face including the front upper flange, the front intermediate face, and the front lower flange as the bumper front face; and the back reinforcement member has a back upper flange extending from a front end of an upper lateral face of the upper back groove, the back upper flange face being brought into surface contact and joined with the front upper flange from the bumper rear face side, a back lower flange extending from a front end of a lower lateral face of the lower back groove, the back lower flange face being brought into surface contact and joined with the front upper flange from the bumper rear face side, the upper lateral face of the upper back groove as an upper bumper lateral face, the lower lateral face of the lower back groove as a lower bumper lateral face, and a face including the bottom faces of the back grooves as the bumper rear face.

When the front reinforcement member and the back reinforcement member are configured as separate bodies, the front upper flange and the back upper flange as well as the front lower flange and the back lower flange are in surface contact and joined, respectively. According to this configuration, the rigidity at each front end (base end at which the front groove and the back groove deform) of the upper lateral face or the lower lateral face of the front groove and the back groove is enhanced. In addition, if the front intermediate face and the back intermediate face are brought into contact, a site of high rigidity is formed. In this configuration, the front groove and the back groove are sandwiched by the sites of high rigidity (namely, above-said front end adjacent to the flanges and the contacting front and back intermediate faces), whereby the front groove and the back groove (especially, each lateral face) can relatively easily deform with respect to the bumper front face. The operation of the present invention for opposing and suppressing the deformation of the front groove and the back groove thus can be easily exhibited. The front reinforcement member and the back reinforcement member, which are sheet metal members of separate bodies, can be respectively manufactured by various types of conventionally known methods (press molding method, roll molding method, and the like). When the front intermediate face and the back intermediate face are brought into contact, such intermediate faces may be joined.

In the bumper reinforcement member of the present invention, the front reinforcement member and the back reinforcement member may be configured as an integrated sheet metal member. Specifically, the front reinforcement member and the back reinforcement member have, a front upper flange extending from a front end of an upper lateral face of the upper front groove folded downward to form a back upper flange to be overlapped on the front upper flange, and the back upper flange continued to a front end of an upper lateral face of the upper back groove; a front lower flange extending from a front end of a lower lateral face of the lower front groove folded upward to form a back lower flange to be overlapped on the front lower flange, and the back lower flange continued to a front end of a lower lateral face of the lower back groove; and a face including the front upper flange, the front intermediate face, and the front lower flange as the bumper front face, the upper lateral face of the upper back groove as an upper bumper lateral face, the lower lateral face of the lower back groove as a lower bumper lateral face, and a face including the bottom faces of the back grooves as the bumper rear face When the front reinforcement member and the back reinforcement member are configured as integrated bodies, the front upper flange and the back upper flange as well as the front lower flange and the back lower flange are formed by folding the plate material. Namely, the plate material of the back upper flange, which extends from the front upper flange, is overlapped behind the front upper flange by folding the plate material . The lower flange is formed in the same way of folding the plate material. According to this configuration, the rigidity at each front end (base end at which the front groove and the back groove deform) of the upper lateral face or the lower lateral face of the front groove and the back groove is enhanced. In addition, if the front intermediate face and the back intermediate face are brought into contact, a site of high rigidity is formed. In this configuration, the front groove and the back groove are sandwiched by the sites of high rigidity (namely, above-said front end adjacent to the flanges and the contacting front and back intermediate faces), whereby the front groove and the back groove (especially, each lateral face) can relatively easily deform with respect to the bumper front face. The operation of the present invention for opposing and suppressing the deformation of the front groove and the back groove thus can be easily exhibited. The front reinforcement member and the back reinforcement member, which are an integrated sheet metal member, preferably form the front intermediate face or the back intermediate face with the end edges of the plate material abutted to each other. The front reinforcement member and the back reinforcement member, which are an integrated sheet metal member, can be traversably integrally manufactured by various types of conventionally known methods (roll molding method, and the like). When the front intermediate face and the back intermediate face are brought into contact, such intermediate faces may be joined.

According to the present invention, enlargement and increase in manufacturing cost can be prevented. The bumper reinforcement member that enhances the energy absorption property can be provided without affecting the designability of the bumper in the vehicle. Specifically, the peak that is generated at first is increased by bringing the front intermediate face of the front reinforcement member and the back intermediate face of the back reinforcement member closer or into contact with each other, the deformation of the front groove of the front reinforcement member and the back groove of the back reinforcement member are opposed to gradually lower the change from the peak load, and the stable and large energy absorption property is achieved. Furthermore, the present invention achieves higher peak load and more gradual energy absorption property by bringing the back intermediate face into contact with the front intermediate face from the bumper rear face side.

FIG. 15 is a graph showing a relationship between the front groove depth B and the energy absorption amount.

DETAILED DESCRIPTION OF THE PREFERRED EMBODIMENTS

Figure 1:
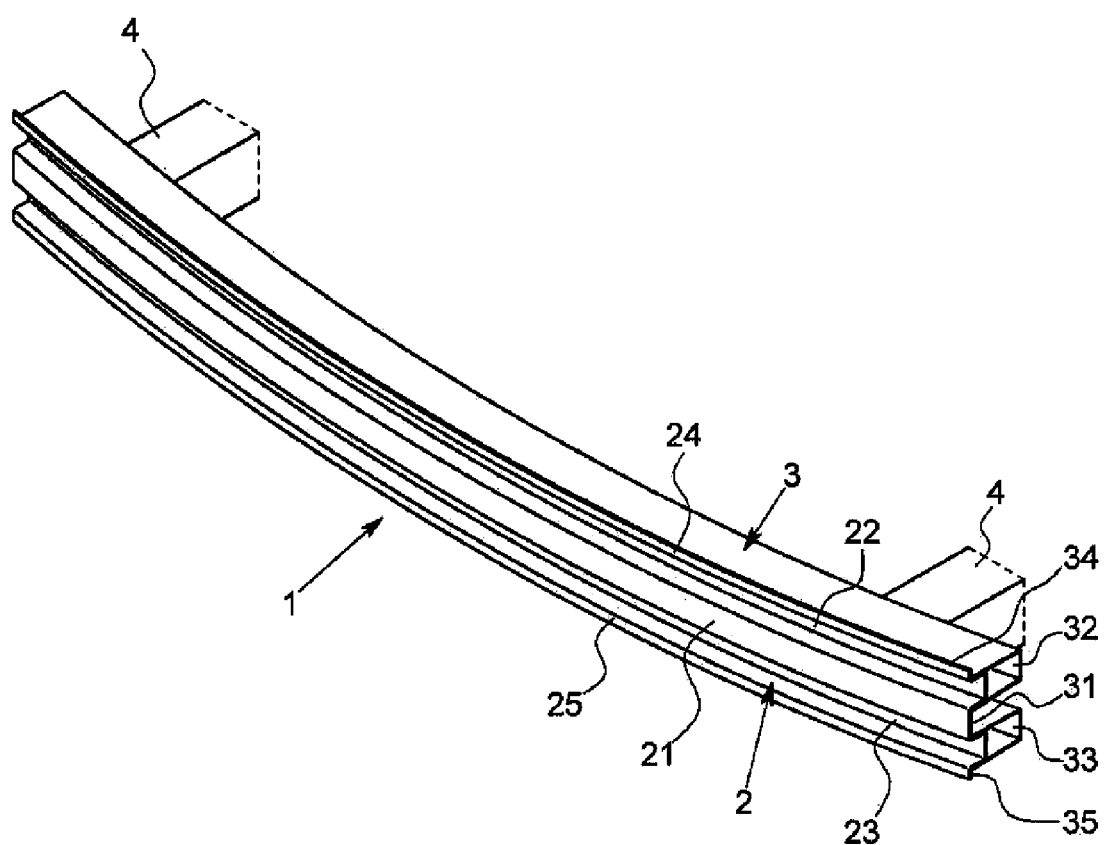
FIG. 1 is a perspective view of a bumper reinforcement member configured by a front reinforcement member and a back reinforcement member of separate bodies (present example)
Figure 2:
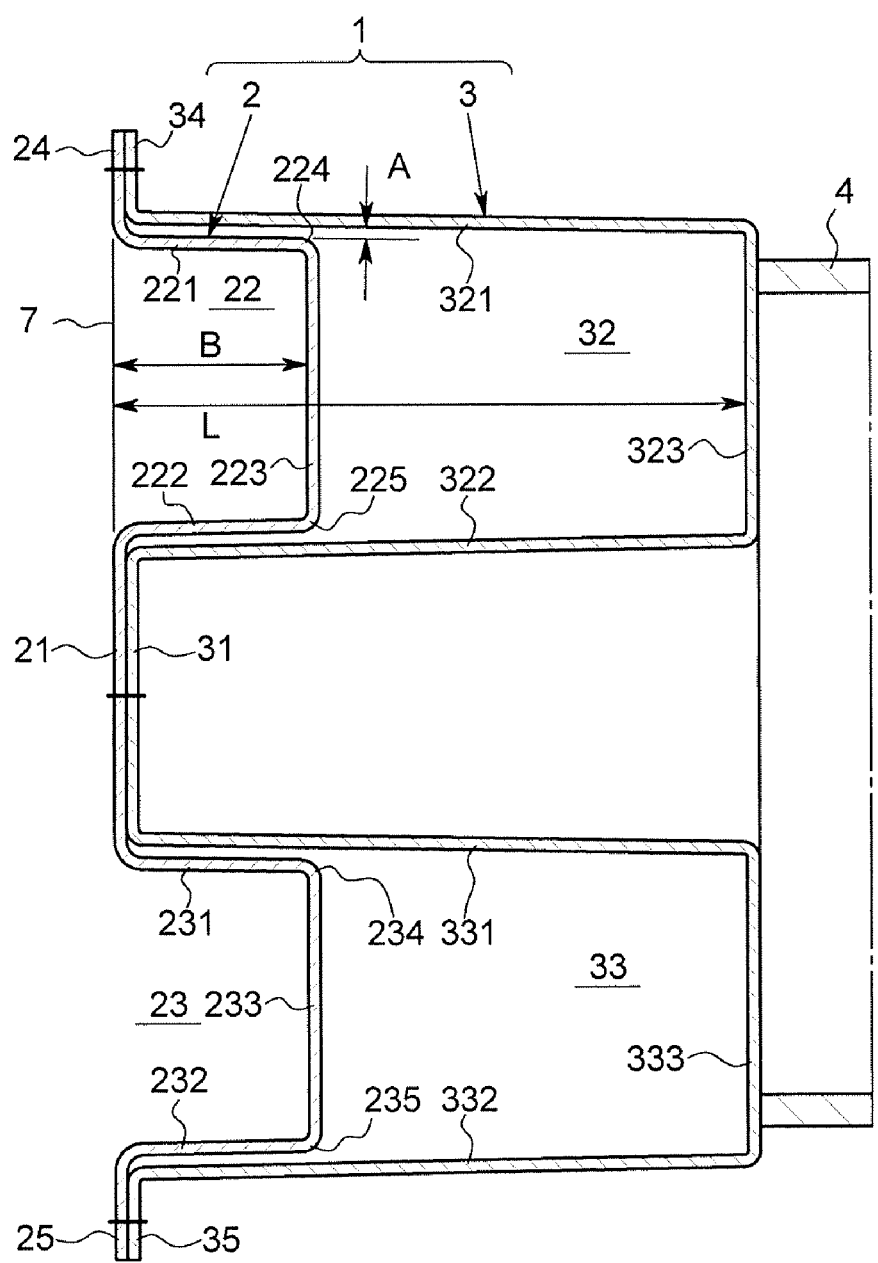
FIG. 2 is a cross-sectional view of the bumper reinforcement member of the present example.

The best modes for carrying out the present invention are described below with reference to the drawings . As illustrated in FIG. 1 and FIG. 2, a bumper reinforcement member 1 of the present invention is configured by assembling a front reinforcement member 2 and a back reinforcement member 3, which are separate bodies made of sheet metal. The bumper reinforcement member 1 is supported by a vehicle frame (not illustrated) through a supporting stay 4 for supporting the back reinforcement member 3. The supporting stay 4 is connected to bottom faces 323, 333 of upper and lower back grooves 32, 33 of the back reinforcement member 3 configuring a bumper rear face. The bumper reinforcement member 1 is normally bridged across a pair of right and left supporting stays 4, 4. The supporting stay 4 may be a square pipe having rigidity, a pipe-shaped member having impact absorbing function, or a member separately incorporating an impact absorbing device.

The front reinforcement member 2 has a configuration in which upper and lower front grooves 22, 23 recessed from a bumper front face side toward a bumper rear face side. The upper and lower front grooves 22, 23 are arranged above and below a front intermediate face 21 parallel to a perpendicular direction. The front grooves 22, 23 have a channel cross section configured by upper lateral faces 221, 231 and lower lateral faces 222, 232 parallel to a horizontal direction, as well as bottom faces 223, 233 parallel to the perpendicular direction. The front reinforcement member 2 of the present example has a front upper flange 24 extending upward in the perpendicular direction from a front end of the upper lateral face 221 of the upper front groove 22, and a front lower flange 25 extending downward in the perpendicular direction from .a front end of the lower lateral face 232 of the lower front groove 23. A face including the front upper flange 24, the front intermediate face 21, and the front lower flange 25 is the bumper front face.

The back reinforcement member 3 has a configuration in which upper and lower back grooves 32, 33 recessed from the bumper front face side towards the bumper rear face side. The upper and lower back grooves 32, 33 are arranged above and below a back intermediate face 31, which is positioned on the front side than the bottom faces 223, 233 of both front grooves 22, 23 and which is parallel to the perpendicular direction. The back grooves 32, 33 have a channel cross section configured by upper lateral faces 321, 331 and lower lateral faces 322, 332 parallel to the horizontal direction, as well as bottom faces 323, 333 parallel to the perpendicular direction. The back reinforcement member 3 of the present example has a back upper flange 34 extending upward in the perpendicular direction from a front end of the upper lateral face 321 of the upper back groove 32, and a back lower flange 35 extending downward in the perpendicular direction from a front end of the lower lateral face 332 of the lower back groove 33. The upper lateral face 321 of the upper back groove 32 becomes the upper bumper lateral face, the lower lateral face 332 of the lower back groove 33 becomes the lower bumper lateral face, and a face including each of the bottom faces 323, 333 of the back grooves 32, 33 becomes the bumper rear face.

The front reinforcement member 2 and the back reinforcement member 3 of the present example have the back intermediate face 31 in contact with the front intermediate face 21 from the bumper rear face side, the back upper flange 34 in contact with the front upper flange 24 from the bumper rear face side, and the back lower flange 35 in contact with the front lower flange 25 from the bumper rear face side. The bumper reinforcement member 1 is configured by joining the front intermediate face 21 and the back intermediate face 31, the front upper flange 24 and the back upper flange 34, as well as the front lower flange 25 and the back lower flange 35 by spot welding or arc welding.

A front groove depth B from the bumper front face (=front intermediate face 21) of the front groove 22 to the bottom face 223 is assumed to be $1/10$ to $1/2$ of a back groove depth L from the bumper front face of the back groove 32 to the bottom face 323 (B=$3/10$ L in the present example). The front groove depth B is a parameter directly related to both a peak load and an energy absorption amount, where the peak load and the energy absorption amount are made large at $1/10$ to $1/2$ of the back groove depth L. Therefore, the front groove depth B is preferably $1/10$ to $1/2$ of the back groove depth L and determined in the range of $1/4$ to $3/10$ of the back groove depth L, if possible, although subjected to restriction such as vehicle design. The back groove depth L is determined from a depth DA (see FIG. 8 to be described later) obtained for the bumper reinforcement member 1. These are the same for the front groove depth B from the bumper front face (=front intermediate face 21) of the front groove 23 to the bottom face 233.

Figure 3:
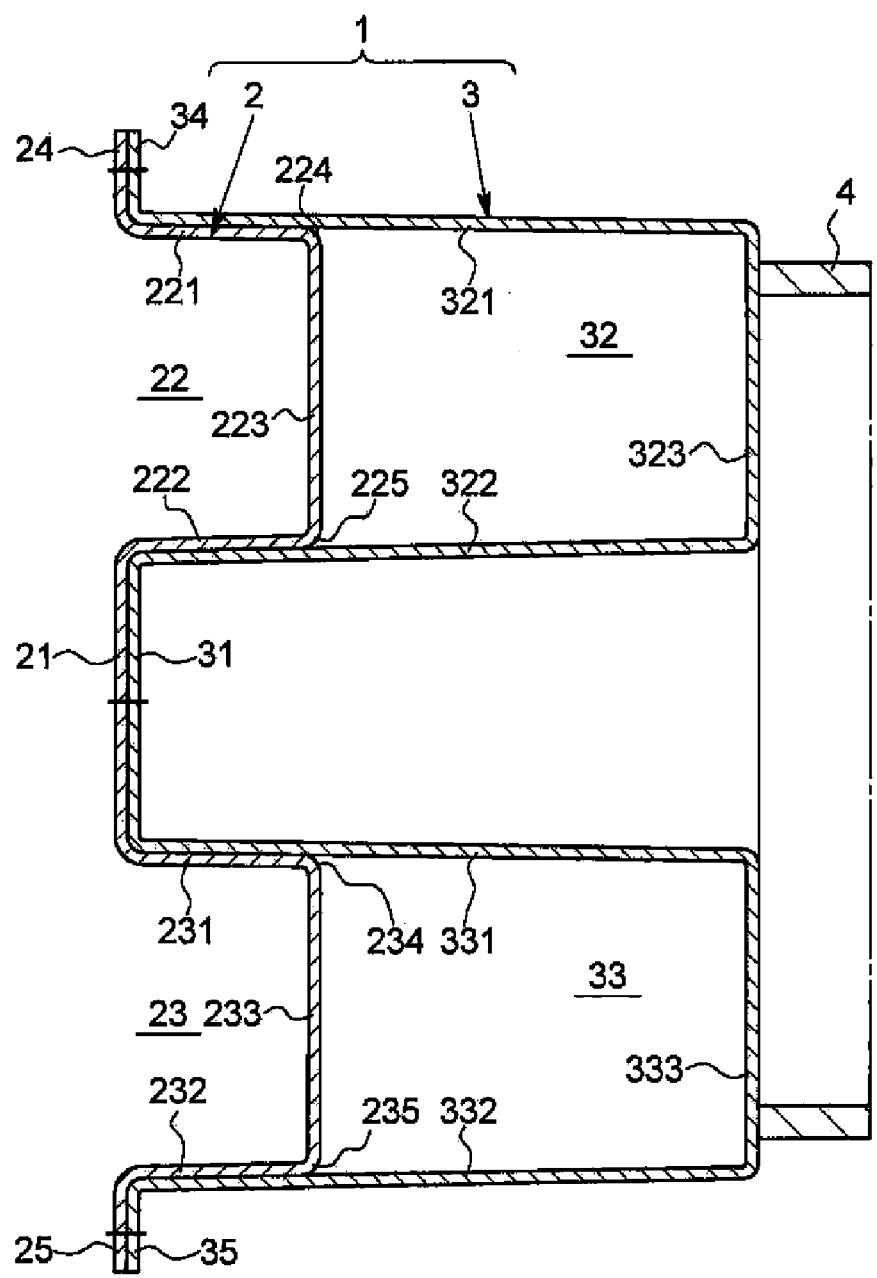
FIG. 3 is a cross-sectional view corresponding to FIG. 2 of the bumper reinforcement member of another example in which a smallest distance A is 0 (zero)

A smallest distance A from a corner 224, 225 connecting the upper lateral face 221 or the lower lateral face 222 and the bottom face 223 of the front groove 22 to the upper lateral face 321 or the lower lateral face 322 of the back groove 32 is smaller than $1/10$ of the back groove depth L (A=$1/20$ L in the present example). The smaller the smallest distance A, in other words, the closer the corner 224, 225 connecting the upper lateral face 221 or the lower lateral face 222 of the front groove 22 and the bottom face 223 is from the upper lateral face 321 or the lower lateral face 322 of the back groove 32, the greater the peak load and the energy absorption amount become. Therefore, the corner 224, 225 may be closely attached to the upper lateral face 321 or the lower lateral face 322 of the back groove 32, as in the bumper reinforcement member 1 of another example in FIG. 3. This is the same for the lower front groove 23 and lower back groove 33. The smallest distance A is from a corner 234, 235 connecting the upper lateral face 231 or the lower lateral face 232 and the bottom face 233 of the front groove 23 to the upper lateral face 331 or the lower lateral face 332 of the back groove 33. A width of the back groove 32 or the back groove 33 (opposing distance of the upper lateral face 321, 331 to the lower lateral face 322, 332) is a numerical value obtained by adding the smallest distance A to the width of the front groove 22 or the front groove 23.

The bumper reinforcement member 1 of the present example uses the same material for the front reinforcement member 2 and the back reinforcement member 3, and has the same plate thickness. The present invention merely needs to be able to oppose the deformation of the back grooves 32, 33 and the deformation of the front grooves 22, 23. The front reinforcement member 2 and the back reinforcement member 3 may be made of different materials or may have different plate thicknesses as long as the back grooves 32, 33 and the front grooves 22, 23 deform at the same amount at the same timing. Furthermore, the corners connecting each face are all formed to an arcuate cross-sectional shape, but the size of the radius of the arc does not influence the effect of the present invention. Thus, the corner connecting the front intermediate face 21 and the lower lateral face 222 of the front groove 22, for example, may be formed to a right angle, if possible.

Figure 4:
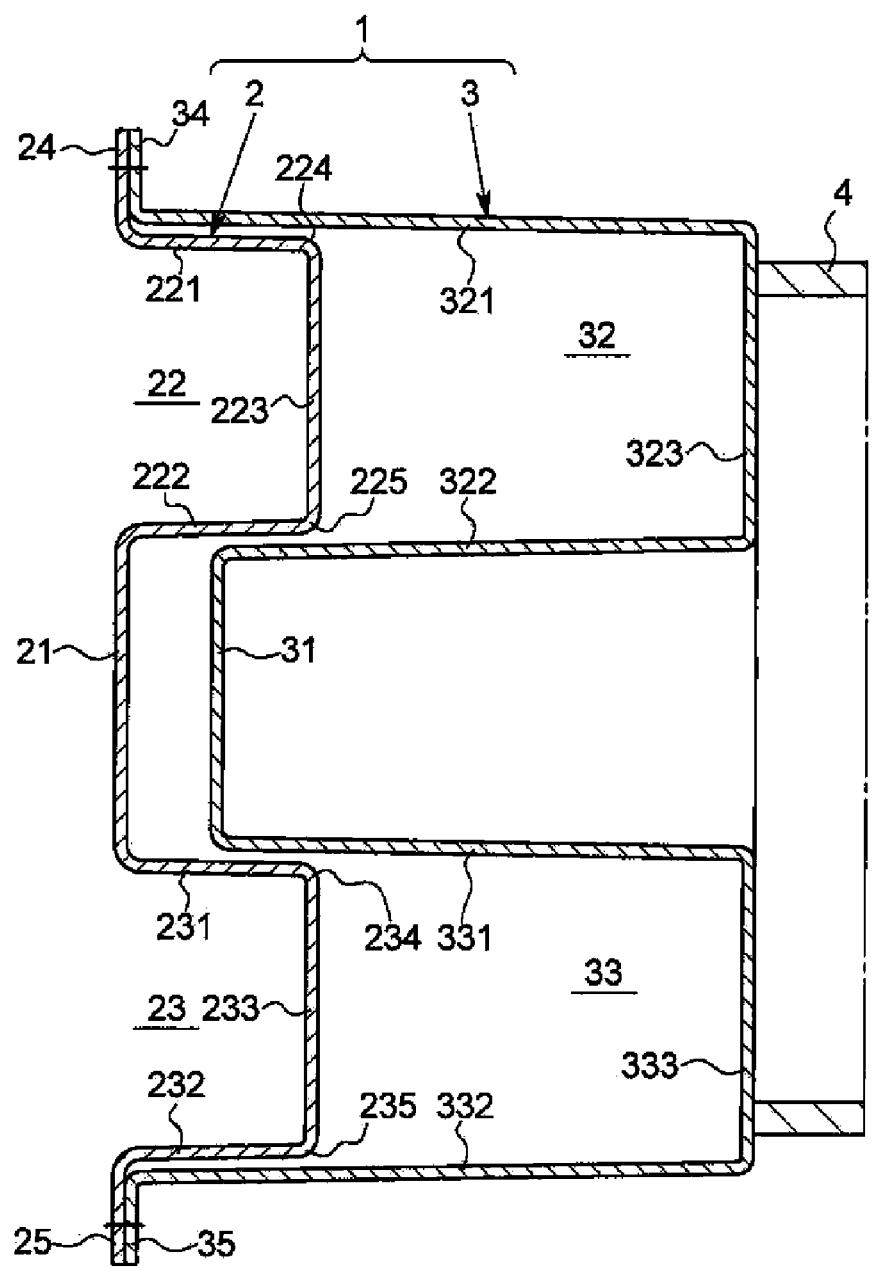
FIG. 4 is a cross-sectional view corresponding to FIG. 2 of the bumper reinforcement member of another example in which a front intermediate face and a back intermediate face are separated.

The bumper reinforcement member 1 of the present invention may be configured with the front intermediate face 21 and the back intermediate face 31 separated as in FIG. 4 as long as the back intermediate face 31 is positioned on the front side than each bottom face 223, 233 of the front groove 22, 23. Thus, an effect of increasing the energy absorption amount of the present invention can be achieved by opposing the deformation of the lower lateral face 222 of the upper front groove 22 to the deformation of the lower lateral face 322 of the upper back groove 32, and opposing the deformation of the upper lateral face 231 of the lower front groove 23 and the deformation of the upper lateral face 331 of the lower back groove 33, and suppressing the respective deformation.

Figure 5:
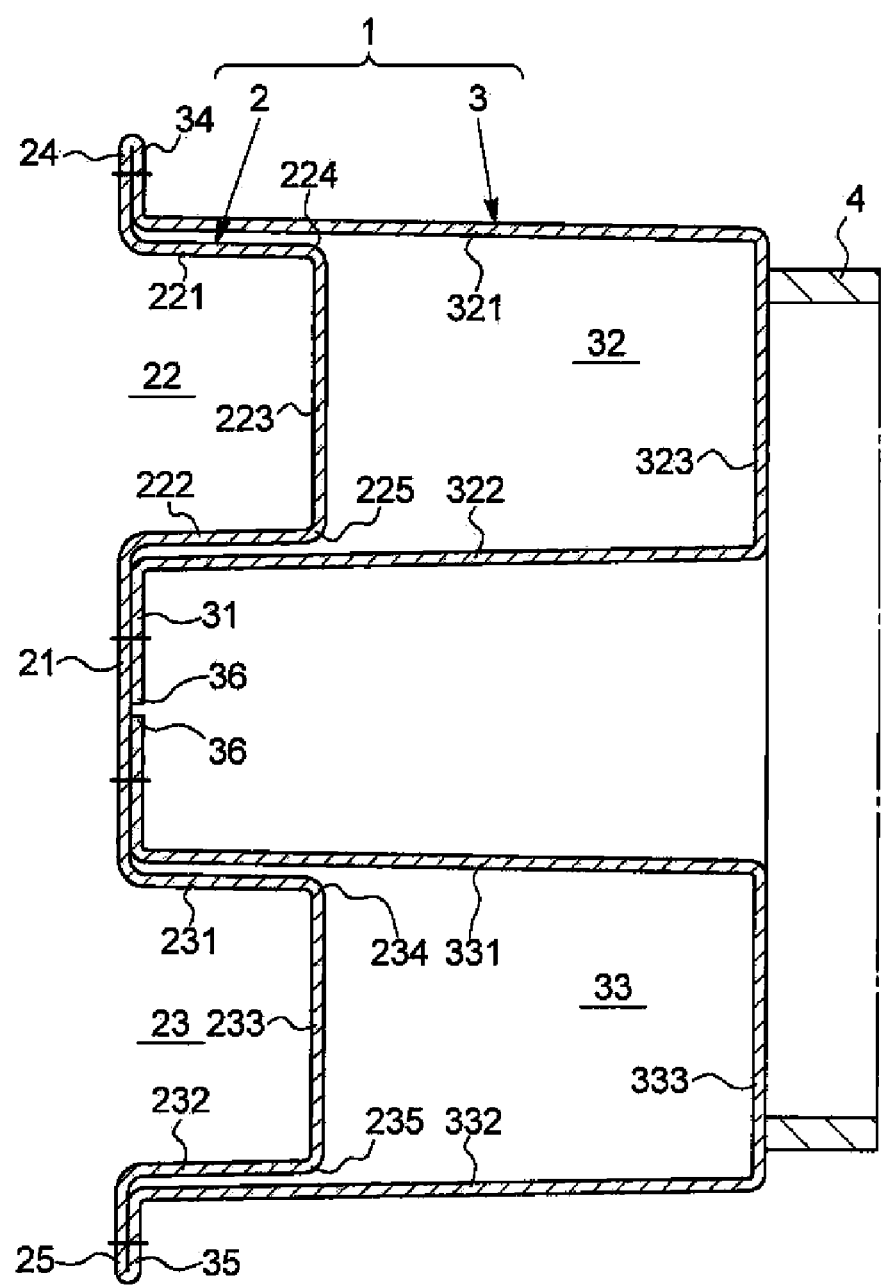
FIG. 5 is a perspective view illustrating another example of a bumper reinforcement member configured by an integrated front reinforcement member and back reinforcement member.

The bumper reinforcement member 1 of the present invention may be configured with the front reinforcement member 2 and the back reinforcement member 3 as an integrated sheet metal member, as in FIG. 5. Specifically, the front reinforcement member 2 and the back reinforcement member 3 have the front upper flange 24 extending from the front end of the upper lateral face 221 of the upper front groove 22 folded downward to form the back upper flange 34 to be overlapped on the front upper flange 24, the back upper flange 34 continued to the front end of the upper lateral face 321 of the upper back groove 32, the front lower flange 25 extending from the front end of the lower lateral face 232 of the lower front groove 23 folded upward to form the back lower flange 35 to be overlapped on the front lower flange 25, the back lower flange 35 continued to the front end of the lower lateral face 332 of the lower back groove 33, and the end edges of the plate material is brought into surface contact and abutted to the front intermediate face 21 from the bumper rear face side thereby forming the back intermediate face 31.

The bumper reinforcement member 1 of another example described above has a face including the front upper flange 24, the front intermediate face 21 and the front lower flange 25 as the bumper front face, the upper lateral face 321 of the upper back groove 32 as the upper bumper lateral face, the lower lateral face 332 of the lower back groove 33 as the lower bumper lateral face, and a face including each of the bottom faces 323, 333 of the back grooves 32, 33 as the bumper rear face. Besides the bumper reinforcement member 1 of another example has the front upper flange 24 and the back upper flange 34, and the front lower flange 25 and the back lower flange 35 respectively continued, the bumper reinforcement member is spot-welded or arc-welded for reinforcement. The end edge of the plate material forming the back intermediate face 31 is spot-welded or arc-welded to the front intermediate face 21.

Figure 6:
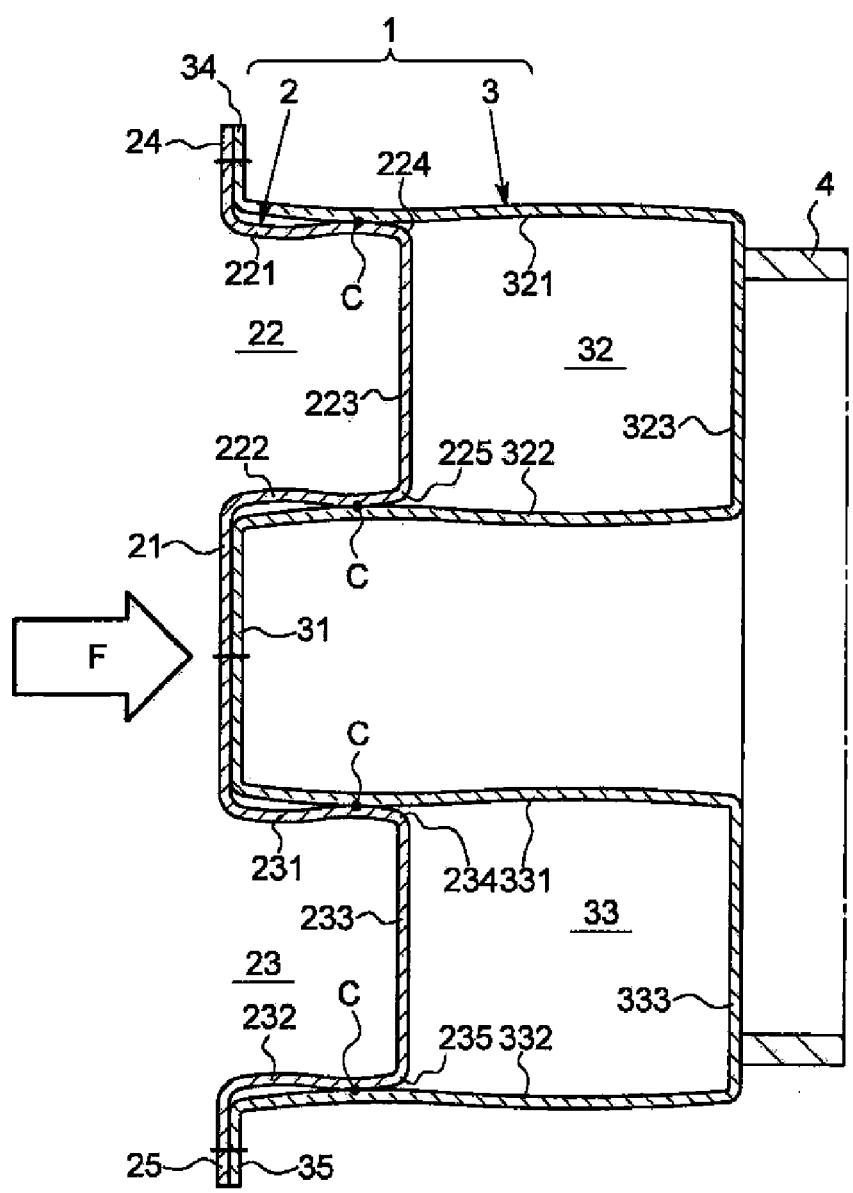
FIG. 6 is a cross-sectional view corresponding to FIG. 2 illustrating the bumper reinforcement member of the present example in which a load F is applied to a bumper front face deforming the same.

When the bumper reinforcement member 1 of the present example (FIG. 1 and FIG. 2) is subjected to a load F at the bumper front face, the front upper flange 24, the front intermediate face 21 and the front lower flange 25, which configure the bumper front face, deform in the extending direction (only the portion applied with the load F is recessed), as illustrated in FIG. 6, thereby deforming the front grooves 22, 23 and the back grooves 32, 33, respectively, and receding the bumper front face. In this case, the bumper reinforcement member 1 of the present example has the front upper flange 24 integrated with the back upper flange 34, the front intermediate face 21 integrated with the back intermediate face 31, and the front lower flange 25 integrated with the back lower flange 35. Therefore, the rigidity of the bumper front face is enhanced, and the peak load that enhances the force-stroke property (load-displacement property) is high.

When the front upper flange 24, the front intermediate face 21, and the front lower flange 25 configuring the bumper front face deform in the extending direction, they recede in the direction of the bumper rear face, and the first half of the opposing lateral faces (221 and 222, 231 and 232) of the front groove 22 and the front groove 23 recess so as to approach each other. The last half expands so as to move away from each other. Since the back upper flange 34, the back intermediate face 31, and the back lower flange 35 also recede in the direction of the bumper rear face, the first half of the opposing lateral faces (321 and 322, 331 and 332) of the back groove 32 and the back groove 33 recess so as to approach each other. The last half expands so as to move away from each other.

The opposing lateral faces (221 and 222, 231 and 232) of the front groove 22 and the front groove 23, and the opposing lateral faces (321 and 322, 331 and 332) of the back groove 32 and the back groove 33 are thus all the same in deforming to an S-shaped cross section. However, the bumper reinforcement member 1 of the present example has the front groove depth B of $3/10$ of the back groove depth L (B=$3/10$ L). Therefore, even if the front grooves 22, 23 and the back grooves 32, 33 all deform to an S-shaped cross section, the last half of the opposing lateral faces (221 and 222, 231 and 232) of the front groove 22 and the front groove 23 that expand to move away from each other and the first half of the opposing lateral faces (321 and 322, 331 and 332) of the back groove 32 and the back groove 33 that recess to approach each other collide at a colliding point C as in FIG. 6. The deformation of the front grooves 22, 23 and the back groove 32, 33 is thus respectively suppressed, and a large energy absorption amount is achieved.

EXAMPLE

Figure 7:
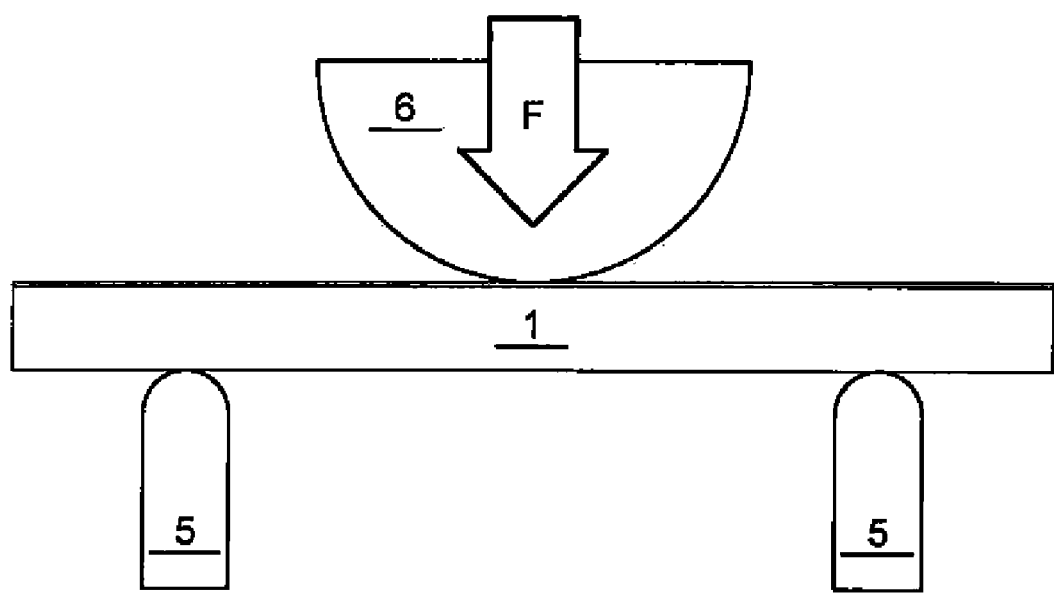
FIG. 7 is a schematic view illustrating a test device for a three-point bending load test for applying the load F in the example and comparative examples.

A three-point bending load test was conducted to evaluate the bumper reinforcement member 1 of the present invention. The test device used in the three-point bending load test is a generally known device. Specifically, as illustrated in FIG. 7, the long bumper reinforcement member 1 is supported at bilaterally symmetric positions on the bumper rear face 13 side by supporting members 5, 5 having a distal end face of an arcuate cross section. The bumper front face is then pushed at the center in the extending direction with an application member 6 having a distal end, face of an arcuate cross section to apply the load F.

Figure 8:
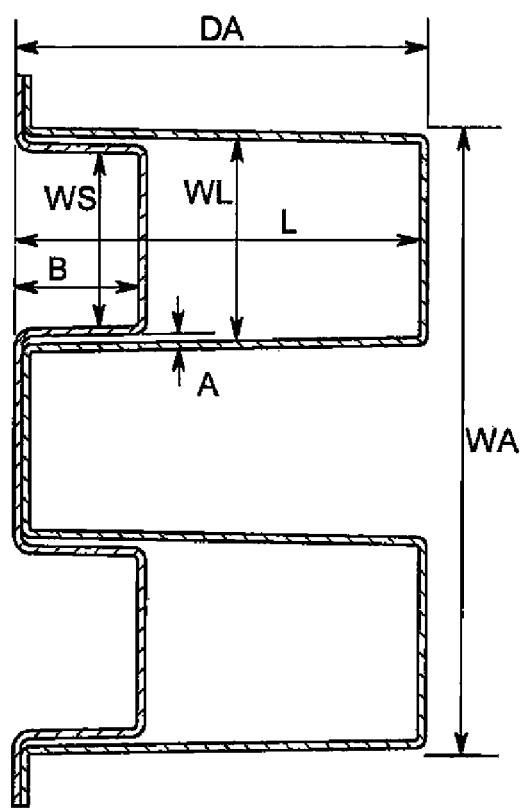
FIG. 8 is a cross-sectional view of the example.

In the example, a 980 MPa material having a plate thickness of 1.2 mm was used for the front reinforcement member and the back reinforcement member, as illustrated in FIG. 8. The height WA of the bumper reinforcement member is 80 mm, the depth DA of the bumper reinforcement member is 40 mm, the smallest distance A is 1 mm, the front groove depth B is 9 mm, and the length in the extending direction (length in the orthogonal direction in the plane of the drawing) is 1200 mm. In the example, the bumper reinforcement member is supported by the supporting members 5, 5 arranged at a spacing of 880 mm.

Figure 9:
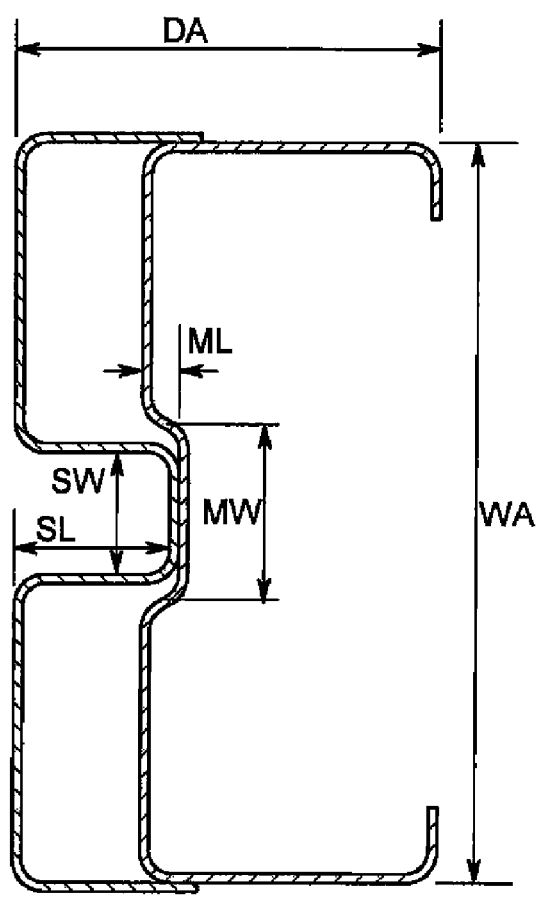
FIG. 9 is a cross-sectional view of a first comparative example.

A first comparative example corresponds to JP2003-237507 as illustrated in FIG. 9, and has a structure in which a supplementary reinforcement member having a depth of 17 mm is attached to a front face of a main reinforcement member having a depth of 28 mm. The main reinforcement member and the supplementary reinforcement member respectively use the 980 MPa material having a plate thickness of 1.2 mm. A groove formed in the main reinforcement material has a width MW of 28 mm and a depth ML of 14.8 mm, and a groove formed in the supplementary reinforcement member has a width SW of 16 mm and a depth SL of 20.8 mm.

Figure 10:
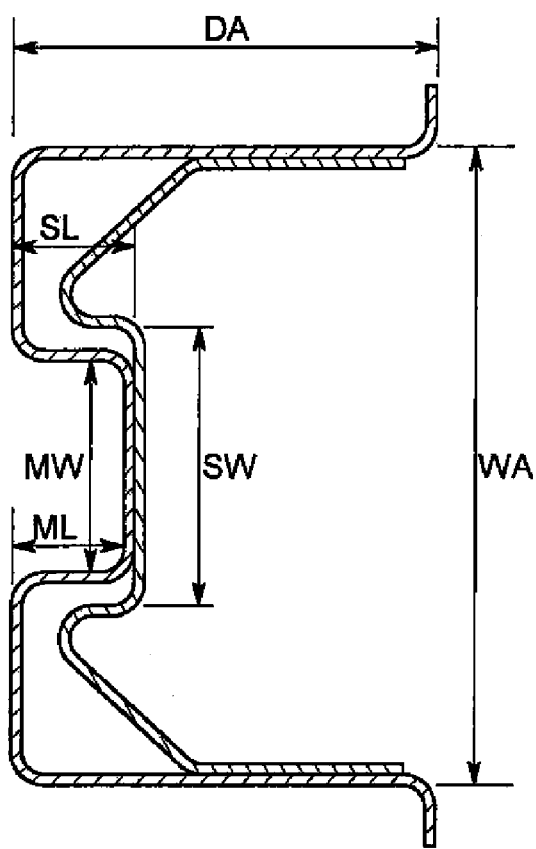
FIG. 10 is a cross-sectional view of a second comparative example.

A second comparative example corresponds to JP2004-074834 as illustrated in FIG. 10, and has a structure in which a supplementary reinforcement member is attached to an inner side of a main reinforcement member. The main reinforcement member and the supplementary reinforcement member respectively use the 980 MPa material having a plate thickness of 1.2 mm. A groove formed in the main reinforcement material has a width MW of 23 mm and a depth ML of 5 mm, and a groove formed in the supplementary reinforcement member has a width SW of 36.9 mm and a depth SL of 16.4 mm. A projection site, which is the characteristic of the second comparative example, is formed to an arcuate cross section of a radius of 3 mm at a position spaced apart by 5 mm from the back face of the bumper front face.

Figure 11:
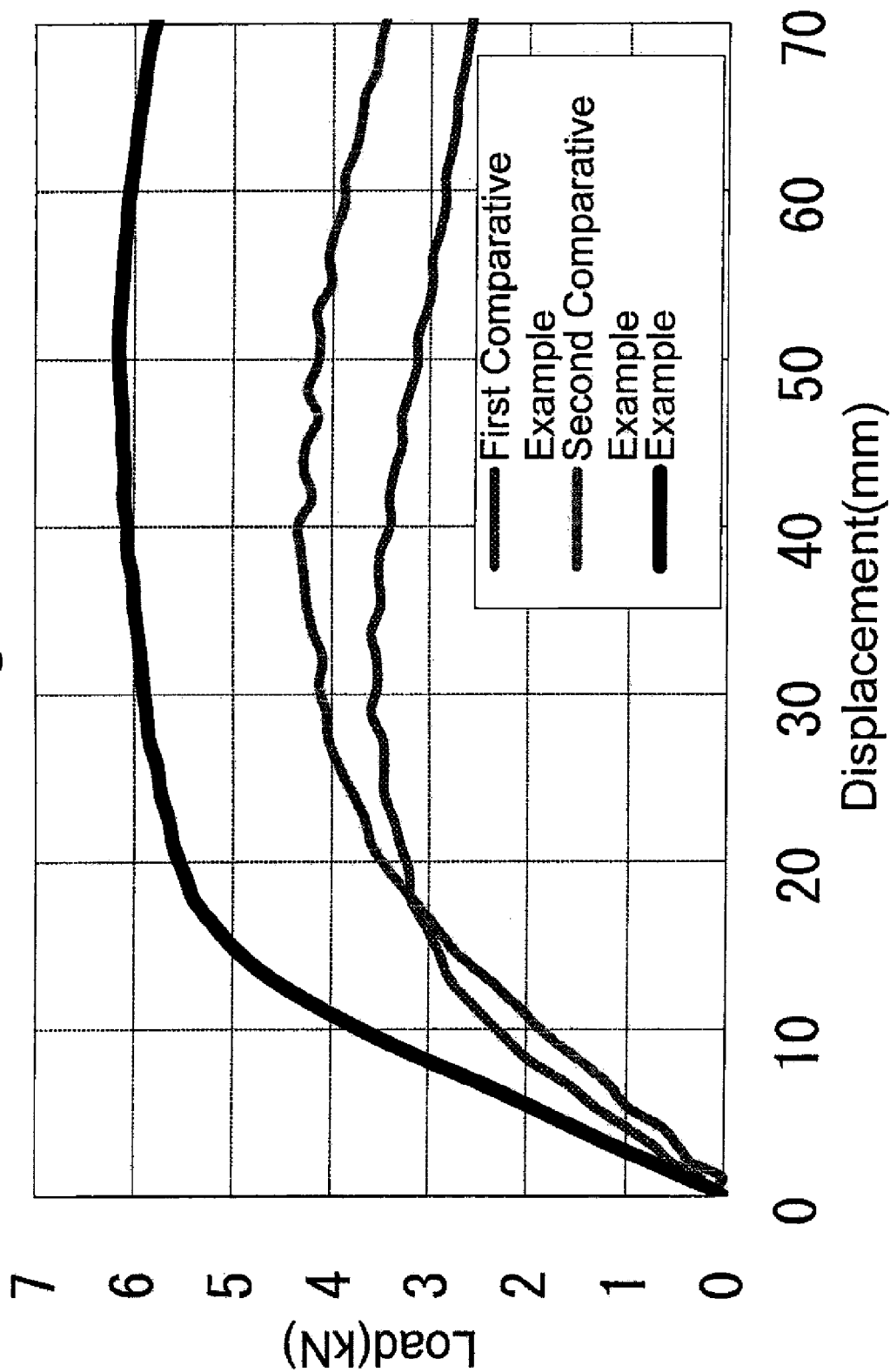
FIG. 11 shows a force-stroke curve indicating the results of the three-point bending load test of the example and each of the comparative examples.

The test results of the example, the first comparative example, and the second comparative example are shown in FIG. 11. The applied load is converted to load per unit mass in order to exclude influences of the amount of the used material in the force-stroke property of FIG. 11. As apparent from the force-stroke property, the load is overall high and the energy absorption amount (area surrounded by the curve) is large in the example compared to the first comparative example and the second comparative example. Furthermore, the change after reaching the peak load is also gradual, no particular fluctuation in the load is found, and the energy absorption property is stable.

The relationship between the smallest distance A and the peak load, the smallest distance A and the energy adsorption amount, the front groove depth B and the peak load, and the front groove depth B and the energy absorption amount was checked for the example. The configuration of the test device and the configuration of the example are as described above. The energy absorption amount is the measurement data until the displacement amount from when the application member 6 collides with the bumper front face of the example reaches 80 mm.

Figure 12:
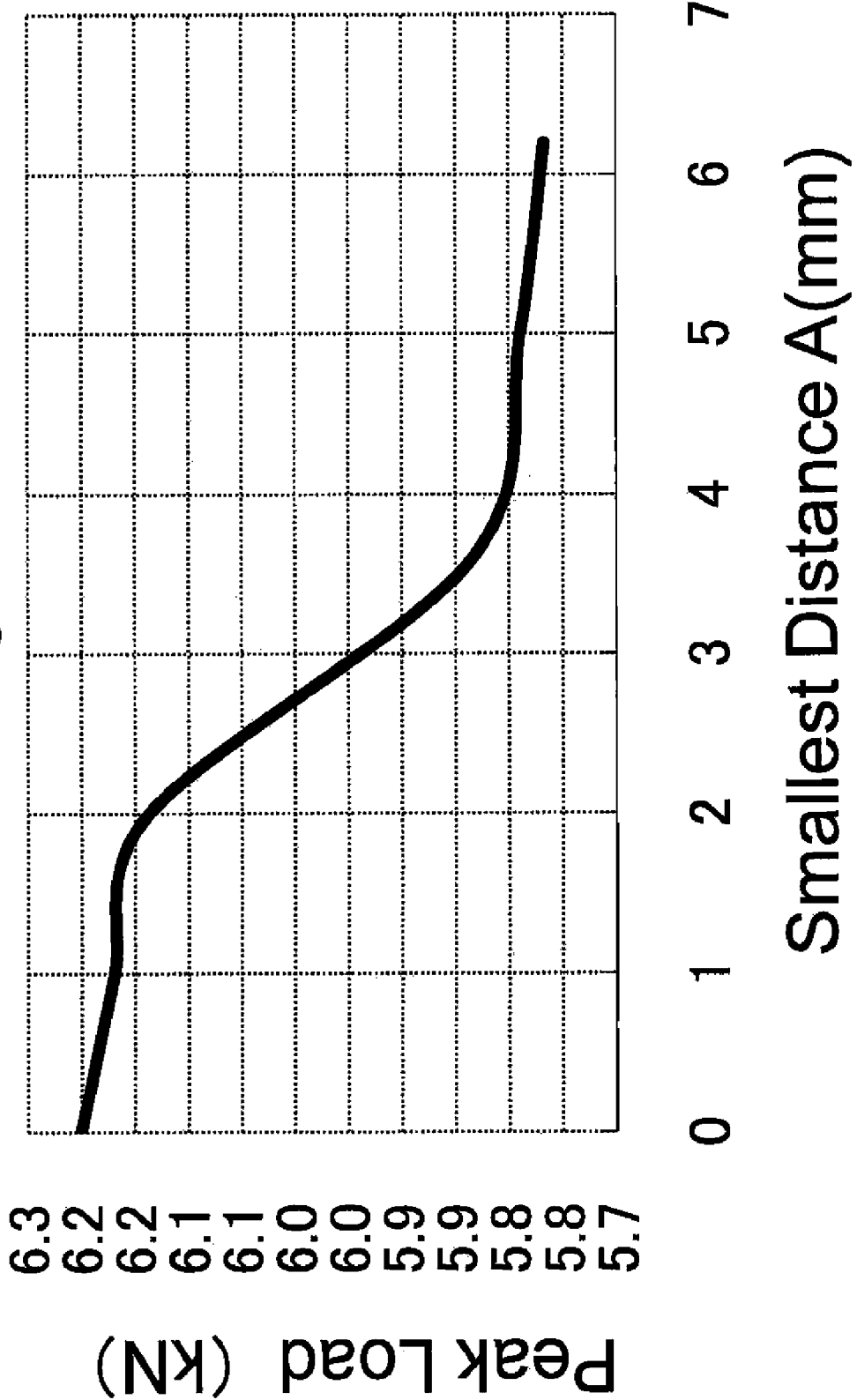
FIG. 12 is a graph showing a relationship between the smallest distance A and a peak load.
Figure 13:
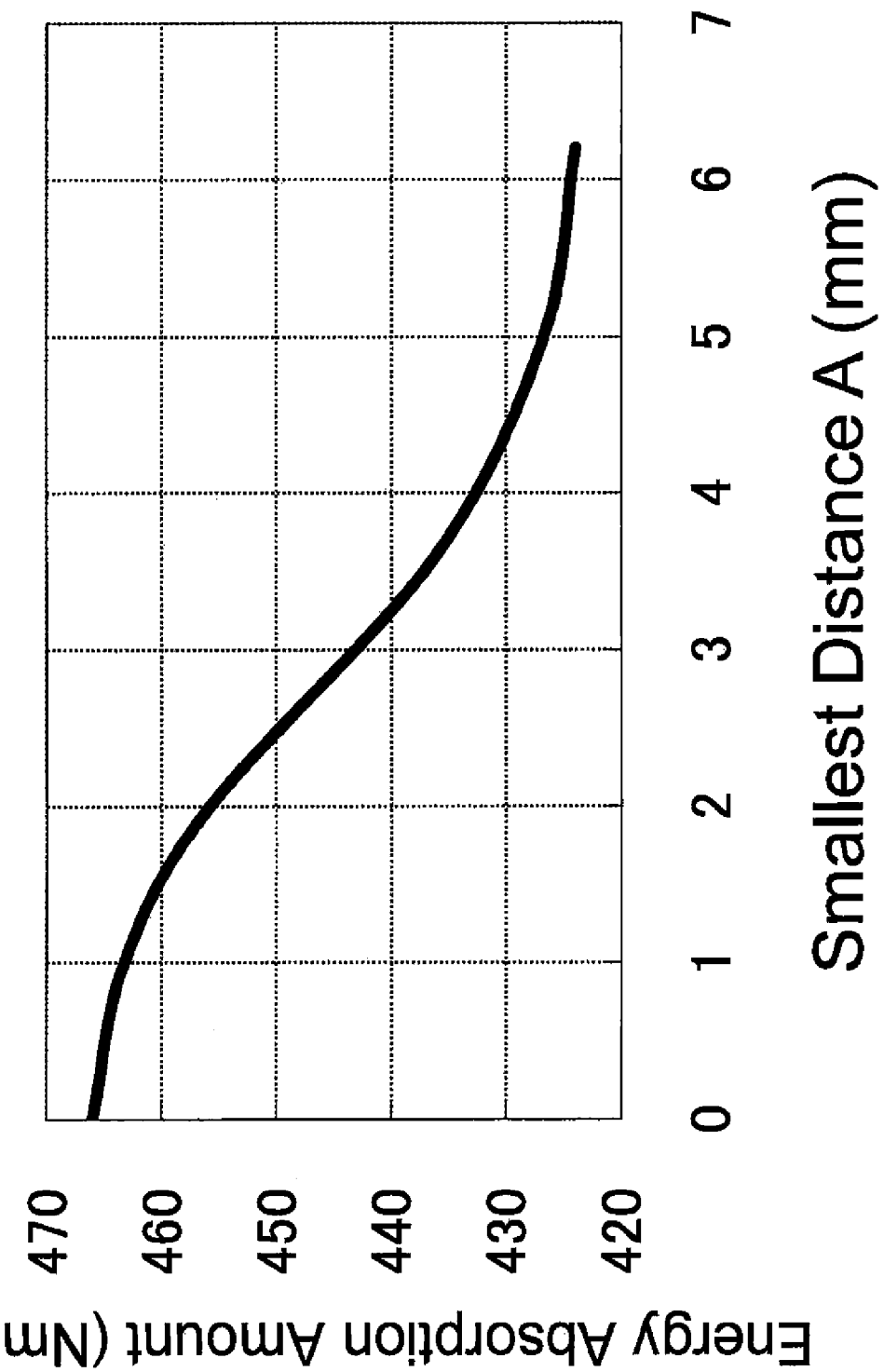
FIG. 13 is a graph showing a relationship between the smallest distance A and an energy absorption amount.

In the three-point bending load test for examining the relationship between the smallest distance A and the peak load, and between the smallest distance A and the energy absorption amount, the front groove depth B was fixed at 10 mm (about ¼ L) and the smallest distance A was changed in the range of 0 mm to 6 mm (about 1/7 L). As a result, as shown in FIG. 12 and FIG. 13, the peak load is the highest and the energy absorption amount is also large when the smallest distance A is "0 (zero)", that is, when the corner connecting the lateral face and the bottom face of the front groove is in contact with the lateral face of the back groove. The energy absorption amount gradually reduces as the smallest distance A becomes larger. The peak load starts to greatly lower when starting to exceed the smallest distance A=2 mm, that is, about 1/20 L, and the lowering starts to stop when exceeding the smallest distance A=4 mm, that is, about 1/10 L. Therefore, the peak load becomes high and the energy absorption amount becomes large if the smallest distance A is smaller than or equal to 1/10 L.

Figure 14:
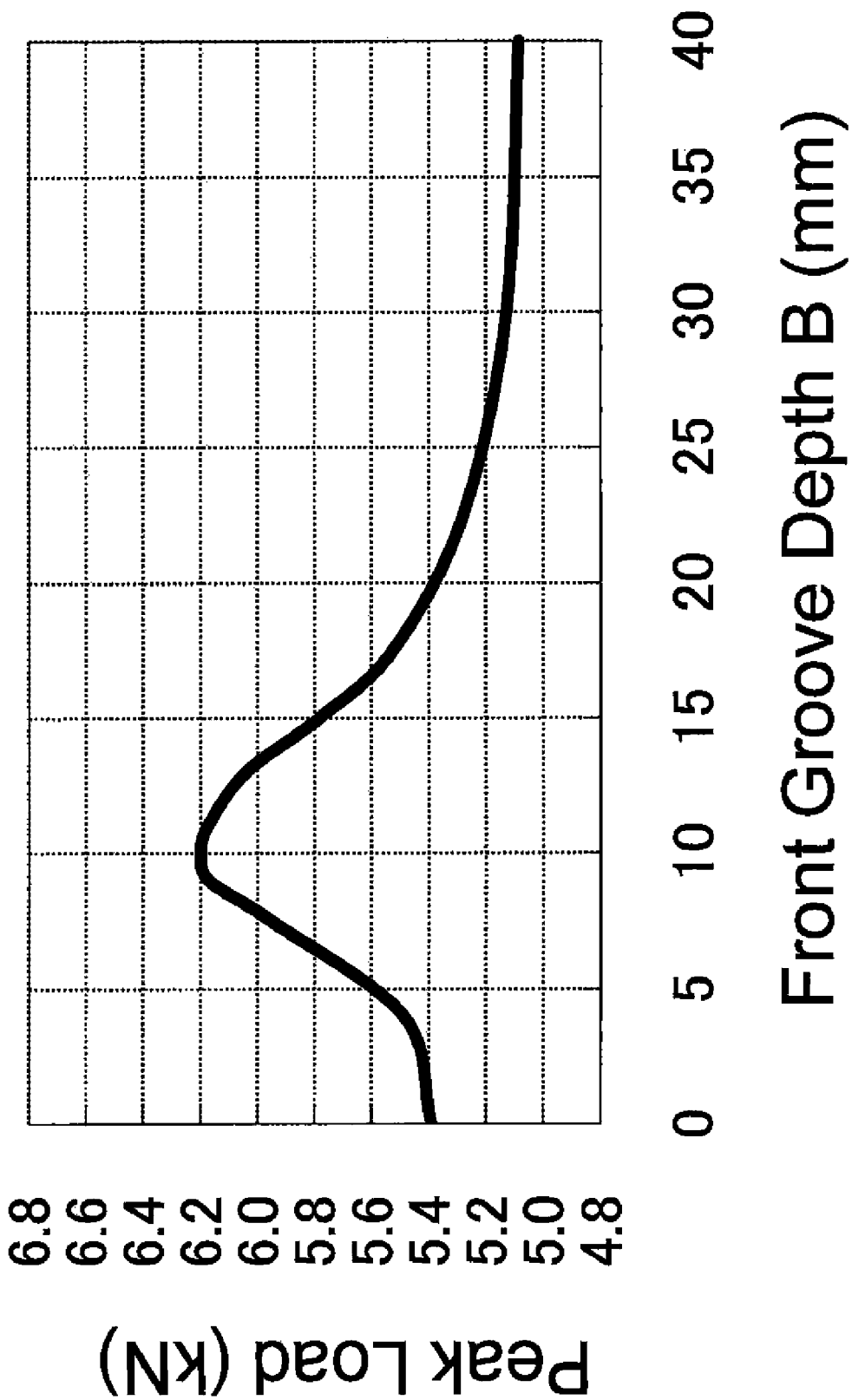
FIG. 14 is a graph showing a relationship between a front groove depth B and the peak load.

In the three-point bending load test for examining the relationship between the front groove depth B and the peak load, and between the front groove depth B and the energy absorption amount, the smallest distance A was fixed at 1 mm (about 1/40 L) and the front groove depth B was changed in the range of 0 mm to 40 mm (about 1 L). As a result, as shown in FIG. 14 and FIG. 15, it was found that both the peak load and the energy absorption amount become maximum when the front groove depth B is 10 mm, that is, about ¼ L. Furthermore, both the peak load and the energy absorption property become small when the front groove depth B becomes small or large. The energy absorption property has a relatively gradual change even when the front groove depth B becomes large. However, the peak load becomes high when the front groove depth B is from 1/10 L to ½ L.

What is claimed is:

1. A bumper reinforcement member comprising:
a front reinforcement member including a front intermediate face and a pair of front grooves, the front intermediate face being a portion of a bumper front face, and the pair of front grooves being arranged above and below the front intermediate face and being recessed from the bumper front face; and
a back reinforcement member including a back intermediate face and a pair of back grooves deeper and wider than the pair of front grooves, the back intermediate face being positioned on the front side than bottom faces of the pair of front grooves, and the pair of back grooves being arranged above and below the back intermediate face and being recessed from the bumper front face;
wherein
the back reinforcement member is coupled to the front reinforcement member,
the pair of back grooves contain therein the pair of the front grooves,
the bottom faces of the pair of front grooves and the bottom faces of the pair of back grooves are not in contact with each other, and
the front reinforcement member and the back reinforcement member satisfy both of following equations;

$$B = (1/10 \text{ to } 1/2)L$$

$$0 \leq A < 1/10 L$$

wherein, B is a depth of the pair of front grooves from the bumper front face to the bottom faces of the pair of front grooves, L is a depth of the pair of back grooves from the bumper front face to the bottom faces of the pair of back grooves and A is a smallest distant from corners connecting upper lateral faces or lower lateral faces and the bottom faces of the pair of front grooves to an opposing upper lateral faces or an opposing lower lateral faces of the pair of back grooves.

2. The bumper reinforcement member according to claim 1, wherein the back intermediate face is in contact with the front intermediate face.

3. The bumper reinforcement member according to claim 1, wherein the front reinforcement member and the back reinforcement member are sheet metal members of separate bodies.

4. The bumper reinforcement member according to claim 3, wherein
the front reinforcement member further includes a front upper flange extending from a front end of an upper lateral face of an upper front groove and a front lower flange extending from a front end of a lower lateral face of a lower front groove,
the back reinforcement member further includes a back upper flange extending from a front end of an upper lateral face of an upper back groove and a back lower flange extending from a front end of a lower lateral face of a lower back groove,
the front upper flange and the back upper flange are joined together, and the front lower flange and the back lower flange are joined together.

5. The bumper reinforcement member according to claim 1, wherein the front reinforcement member and the back reinforcement member are integrated sheet metal members.

6. The bumper reinforcement member according to claim 5, wherein
the front reinforcement member further includes a front upper flange extending from a front end of an upper lateral face of an upper front groove and a front lower flange extending from a front end of a lower lateral face of the lower front groove,
the back reinforcement member further includes a back upper flange extending from a front end of an upper lateral face of an upper back groove and a back lower flange extending from a front end of a lower lateral face of a lower back groove,
the front upper flange is folded downward thereby being continuous to the back upper flange, and
the front lower flange is folded upward thereby being continuous to the back lower flange.

7. The bumper reinforcement member according to claim 1, wherein each of the lateral faces of the front grooves and each of the lateral faces of the back grooves is bent into an S shape.

* * * * *